May 9, 1933.  S. R. DUNHAM  1,908,329
FILTER
Filed May 10, 1930
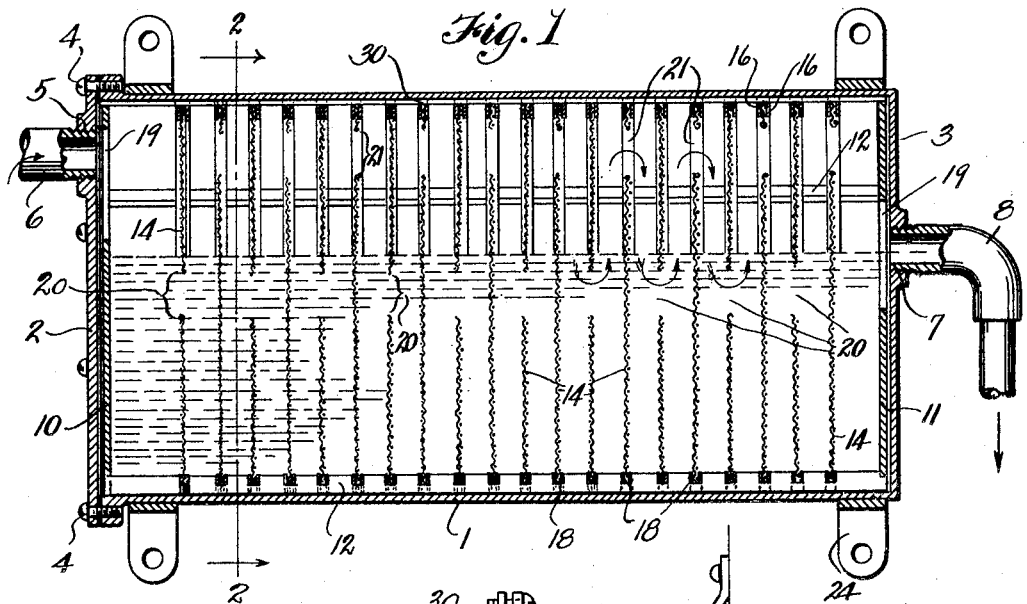
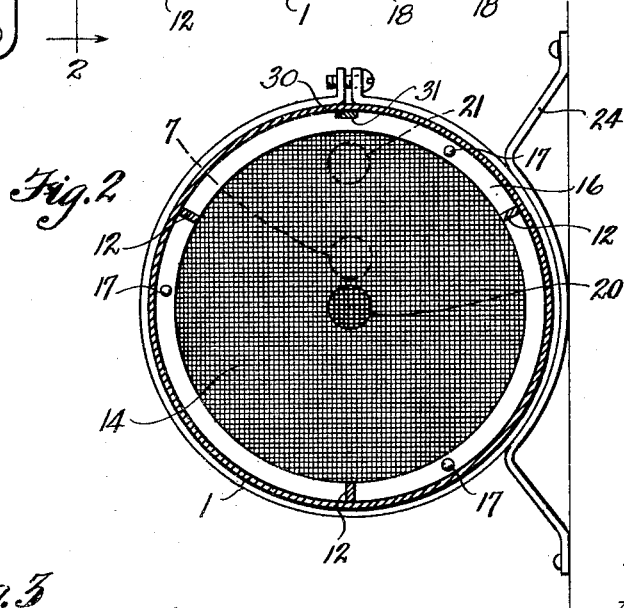
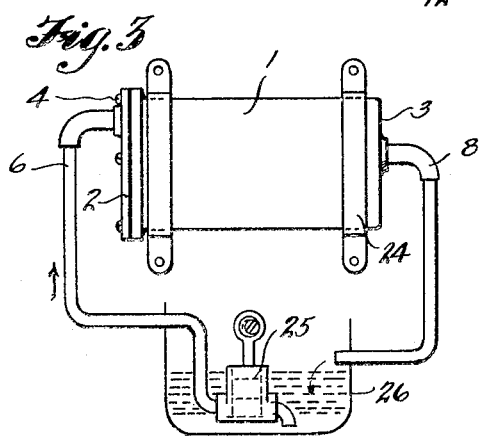
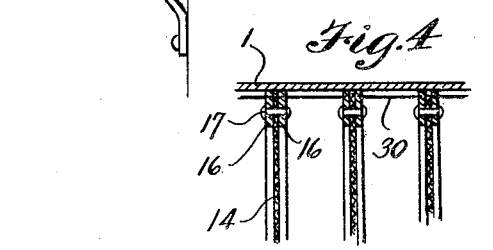
INVENTOR
SIDNEY R. DUNHAM
BY
Cook & Robinson
ATTORNEY Patented May 9, 1933

1,908,329

UNITED STATES PATENT OFFICE

SIDNEY R. DUNHAM, OF SEATTLE, WASHINGTON

FILTER

Application filed May 10, 1930. Serial No. 451,295.

This invention relates to filters, and it has reference in particular to devices for filtering liquids and gases; especially oil, gasolene or other liquid fuels or lubricants such as are now extensively used in the operation of internal combustion engines.

In the present instance, the device has been illustrated in connection with an oiling system, such as might well be employed in connection with an automobile engine, but it is to be understood that this is simply an illustration of one of the principal uses of the device and it is not intended that it be limited to the filtering of oil or to the particular combination shown.

The present device employs a series of filtering screens in a novel construction and arrangement. and in connection with this statement, it will here be stated that, heretofore filtering screens have been employed, but generally their arrangement has been such that there was no outlet for the filtered fluid except through the mesh of the screens employed, and when these once became clogged, the flow through the filtering device was definitely stopped.

In view of the above, it has been the principal object of the present invention to provide a filtering device which will operate to remove all foreign matter from the liquid or gas being filtered, but which cannot, under any circumstance, become clogged to stop the flow through the filter.

More specifically stated, the present invention resides in the provision of a filtering device comprising a filtering chamber having an inlet at one end, and outlet at a lower level at the opposite end, and having a plurality of vertical filtering screens dividing the chamber between the inlet and outlet and through which the liquid will pass for filtering; alternate screens being provided with open passages well above the outlet, and the other screens having open passages just below the level of the outlet but well above the base of the filter, through which a free flow of the material being filtered may take place in the event the screens become clogged sufficiently to prevent a desired flow.

Other objects of the invention reside in the various details of construction, and in the combination of parts, and in the mode of operation, as will hereinafter be described.

In accomplishing these and other objects of the invention, I have provided the improved details of construction, the preferred forms of which are illustrated in the accompanying drawing, wherein—

Fig. 1 is a longitudinal, vertical section of a filtering device embodying the present invention.

Fig. 2 is a cross sectional view of the same on the line 2—2 in Fig. 1.

Fig. 3 is a diagrammatic view illustrating use of the device in connection with an oil circulating pump.

Fig. 4 is a sectional detail illustrating a method of mounting the filter screens.

Referring more in detail to the drawing—

The filter device, in a preferred form of construction, comprises a cylindrical body or housing 1 forming the filter chamber. This housing is disposed axially in a horizontal position and it is closed at its opposite ends by end walls 2 and 3; the wall 2 here shown as being removably attached by means of a plurality of screws 4 to give access to the interior for installation, removal, or replacement of the screens, and for cleaning out the filter after it has been in use.

Entering the end wall 2 through an opening 5 located close to the top wall of the chamber is a pipe 6 through which the material to be filtered is delivered to the device, and connected with an outlet port 7 in the opposite end wall is a pipe 8 whereby the filtered material may be withdrawn; this outlet being somewhat below the level of the inlet 5 and is a little above the axial center of the body.

Fitted closely within the body or chamber 1 is a frame structure comprising opposite end plates 10 and 11 disposed closely against the opposite end walls 2 and 3 and joined by longitudinally extending, connecting strips 12 which are disposed closely against the side walls of the chamber, as shown in Figure 2. Supported within this frame, parallel to each other and transversely of the axis of the chamber, is a series of filtering screens 14. The number of screens employed and the mesh of the screen would be dependent of the character of the material being filtered. As here shown there are twenty screens and they are spaced approximately one-fourth inch apart but this distance might be made more or less to meet conditions.

In the present construction each of the screens is bound about its peripheral edges between two rings 16—16 and rivets 17 secure the rings together. These several rings are mounted in the frame by a sort of dovetailed connection with the longitudinal bars or strips 12, as at 18, and they fit closely against the inner surface of the chamber to preclude any possible leakage between the screens and chamber walls.

The end plates 10 and 11 are provided with openings 19 registering with the inlet and outlet, and each alternate screen, starting with the one nearest the inlet end of the chamber, is provided at its center with an opening 20 of substantially the same area as the inlet. Likewise, each intermediate screen is provided near the top edge with an opening 21 of like size. During ordinary use, oil, or any other liquid being filtered will enter the filter chamber through the inlet pipe 6 and will filter through the series of screens 14 to fill the chamber up to the level of the outlet port and will be drawn off through pipe 8. All sediment, or other foreign matter contained in the liquid when delivered into the chamber is caught by the screens and naturally settles to the bottom of the chamber and is retained by reason of its being unable to pass through the screens.

Should any screen for any reason become clogged by reason of the foreign matter collected, flow of liquid through the filtering device will not be interrupted but will continue by reason of the opening provided for that purpose in the screen. For instance, should every screen in the filter become clogged, the flow of liquid will still continue through the openings 20 and 21 along the path indicated by the series of arrows in Figure 1. This is a very important feature of the invention, as it positively insures against stoppage of the flow of liquid even though the filtering effect on the liquid is to some extent impaired. It is not to be understood, however, that clogging of the screens will not cause the device to stop functioning as a filter, for this is not the case, but on the contrary its effectiveness is still very material by reason of the baffling action of the screens which causes foreign matter to be precipitated to the base of the chamber.

In Figure 3, I have shown the device as used in an oiling system for motor vehicles' engines. In this view the chamber 1 is supported by brackets 24 and supply pipe 6 is attached to a pump 25 and the delivery pipe 8 leads into a crank case 26, or the like, which receives the filtered oil. Operation of the pump delivers the oil through the filter and it is returned to the crank case for use. In this way it is kept in a purified condition.

To clean the device, it is only necessary to remove the end wall 2 and then withdraw the frame which supports the filter screens. These may be washed to remove all sediment and, after the chamber is likewise cleaned, the frame is again replaced and the end wall secured in place. A guide rib 30 is fixed to the wall of the chamber and the rings 16 are notched, as at 31 in Figure 2, to receive it so that it is not possible to insert the frame in any but the correct position.

It is intended also that filters of this character be employed for filtering gasolene, or oil fuel as delivered for use to the engines of automobiles or airplanes, or to stationary engines. In filtering gasolene, it has been found possible to use screens of sufficiently small mesh that all foreign matter and water will be withheld. This is very desirable in airplane operation.

It is not the intention that the device be used only in the form illustrated, but that it also be made up in cylindrical form adapted to be disposed vertically with the filter screens arranged in concentric circles; the liquid to be filtered being received at the center and withdrawn at the outside or vice versa, and with the alternate screens provided with by-pass openings accordingly as herein disclosed.

Devices of this character may be made in various sizes, shapes and of various materials without departing from the spirit of the invention and it is not intended that the following claims limit the construction to the details herein shown, but that they broadly cover the device commensurate with the scope of the invention.

Having thus described my invention what I claim as new therein and desire to secure by Letters-Patent, is:

1. A liquid filter comprising a filter chamber having an outlet substantially above the bottom of the chamber and having an inlet at a higher level, a series of vertical filter screens spaced apart and dividing the chamber between the inlet and the outlet and through which liquid will filter in passing from the inlet to the outlet, said alternating screens being provided with openings substantially in line with the inlet and the other screens having openings substantially above the bottom of the chamber and slightly below the line of the outlet.

2. A liquid filter comprising a filter chamber having an inlet at one side near the top thereof and having an outlet in the opposite side at a lower level than the inlet, a series of spaced apart filter screens vertically dividing the chamber between the inlet and the outlet, alternate screens having openings therein substantially in line with the inlet and the other screens having openings therein slightly below the level of the outlet.

Signed at Seattle, Washington, this 3rd day of May, 1930.

SIDNEY R. DUNHAM.